United States Patent [19]

Mawardi

[11] Patent Number: 4,779,458
[45] Date of Patent: Oct. 25, 1988

[54] FLOW SENSOR

[76] Inventor: Osman K. Mawardi, 15 Mornington La., Cleveland Heights, Ohio 44106

[21] Appl. No.: 946,911

[22] Filed: Dec. 29, 1986

[51] Int. Cl.$^4$ ............................................. G01F 1/68
[52] U.S. Cl. ..................................... 374/41; 73/204.19
[58] Field of Search ............................ 73/204; 374/41

[56] References Cited

U.S. PATENT DOCUMENTS

| | | | |
|---|---|---|---|
| 2,859,617 | 11/1958 | Adams | 73/204 |
| 3,352,154 | 11/1967 | Djorup | 73/204 X |
| 3,604,261 | 9/1971 | Olin | 73/204 X |
| 3,942,378 | 3/1976 | Olmstead | 73/204 |
| 4,016,759 | 4/1977 | Baker et al. | 73/204 |
| 4,083,244 | 4/1978 | Agar et al. | 73/204 |
| 4,255,968 | 3/1981 | Harpster | 73/204 |
| 4,283,944 | 8/1981 | Gruner et al. | 73/204 |
| 4,433,576 | 2/1984 | Shih et al. | 73/204 |
| 4,448,081 | 5/1984 | Kolitsch et al. | 73/861.03 |
| 4,464,932 | 8/1984 | Ewing et al. | 73/204 |
| 4,468,963 | 9/1984 | Schaubee | 73/204 |
| 4,478,076 | 10/1984 | Bohrer | 73/204 |
| 4,478,077 | 10/1984 | Bohrer | 73/204 |
| 4,527,427 | 7/1985 | Grunwald | 73/204 |
| 4,599,895 | 7/1986 | Wiseman | 73/204 |
| 4,685,324 | 8/1987 | Bourdon | 73/204 X |
| 4,685,331 | 8/1987 | Renken et al. | 73/204 |

FOREIGN PATENT DOCUMENTS 0705345 12/1979 U.S.S.R. ................................ 73/204

OTHER PUBLICATIONS

Waters, Thermal Mass Flowmeters, CE Forum May, 1985, pp. 150, 152, 153, 156–159.
Gramatte, Measuring Energy Consumption of Heating Installations, 1985 (?), pp. 648–657.
Muller, Self-heated Thermistor Arrays, 1985 (?), pp. 131–137.
Ozimok et al., Low Velocity Calibration, 1985 (?), pp. 139–148.
Kogol, Droplet Flux Estimation Using a Thermal Anemometer, 1985 (?), pp. 123–129.
Hitachi, Ltd., Hot Wire Mass Air Flow Meter, 1985 (?), pp. 1–6.

Primary Examiner—Herbert Goldstein
Attorney, Agent, or Firm—Frederic B. Schramm

[57] ABSTRACT

A flow-sensing system is provided which employs a pair of sensing resistors. One of the resistors is disposed within flowing fluid, while the other is shielded from the flow. The sensor resistances are held constant by identical feedback circuits which maintain the relationship between current values in the sensors for this purpose. The required difference in currents in the two resistors enables fluid flow to be computed.

Input and output temperature sensors are provided to enable temperature difference to be measured and combined with fluid-flow to indicate the rates of BTU flow. One temperature sensor and the fluid-flow sensors constitute an assembly miniaturized in a solid state chip.

13 Claims, 3 Drawing Sheets

4,779,458

FLOW SENSOR

An object of the invention is to provide a rugged, durable, highly accurate flowmeter which operates well with low velocities of fluid for which measurements are desired.

A further object is to provide apparatus which consumes relatively low power, is highly compact, may safely be used in flammable fluids, and which gives quick response to changes in the rate being measured.

Furthermore it is an object to provide apparatus which may be employed for measurements on either liquids or gases.

BRIEF DESCRIPTION

In carrying out the invention in accordance with a preferred embodiment thereof a temperature sensor together with a velocity sensor is mounted in a cavity in a thin slab of electrically insulating material immersed in the flowing fluid. The velocity or fluid-flow rate sensor comprises a resistor exposed to the fluid flow and a resistor shielded from this flow. Currents are fed to the resistors and controlled in relative value to maintain the resistors at constant resistance and temperature. Fluid-flow rate is computed from the difference between the two currents. Input and output temperatures of the fluid are measured to enable BTU rate to be ascertained by multiplying fluid temperature difference by the fluid-flow rate.

A better understanding of the invention will be afforded by the following detailed description considered in conjunction with the accompanying drawings, in which FIG. 1 is a schematic diagram of a heating or cooling rate system constituting an embodiment of the invention.

FIG. 2b is a view of a cross-section, X—X*, through the device of FIG. 2a.

Like reference characters are utilized throughout the drawings to designate like parts.

DETAILED DESCRIPTION

Figure 1:
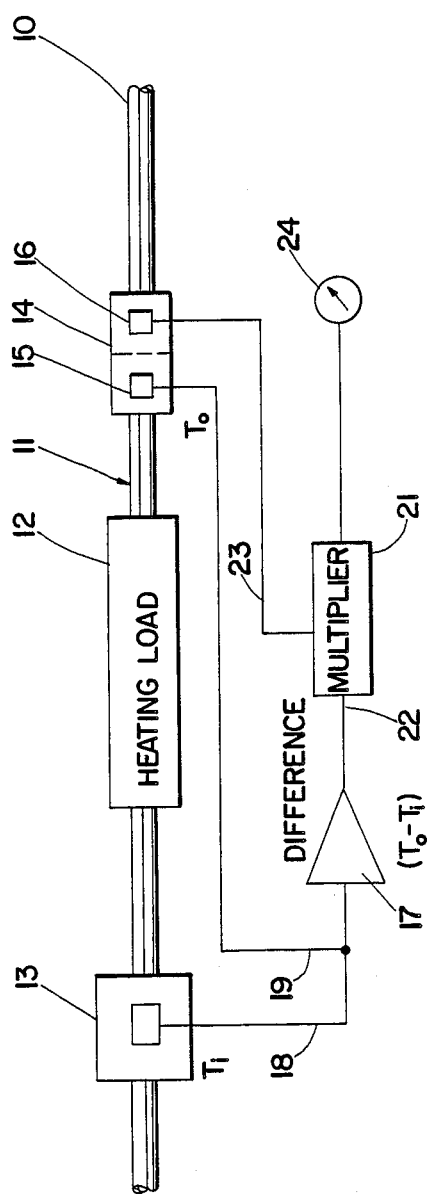

The embodiment of the invention illustrated is provided to measure both the rate of flow of fluid 10 through a pipe 11, and the rate of heat flow, or BTU rate, or heat consumption of a heating load 12 such as a dwelling heated (or cooled) by fluid such as steam, hot water (or refrigerant) flowing through the pipe 11.

A temperature sensor 13 is provided to measure input temperature $T_i$, and a second temperature sensor 15 (FIG. 2b) in a schematically represented unit 14 is provided to measure output temperature $T_o$. The output temperature sensor 15 is incorporated in the unit 14 together with a sensor 16 for measuring fluid flow rate Q, as shown in detail in FIG. 2b.

A differential amplifier 17 is provided with input lines 18 and 19 from the temperature sensors 13 and 15. There is a multiplier 21 having input lines 22 and 23. The first input line 22 leads from the output of the differential amplifier 17, whereas the line 23 supplies the multiplier 21 indirectly from the flow sensor 16. For indicating thermal flow rate there is a suitable instrument 24 responsive to output from the multiplier 21. Measurement of heat flow through the load 12 is thus provided by the instrument 24.

Figure 2B:
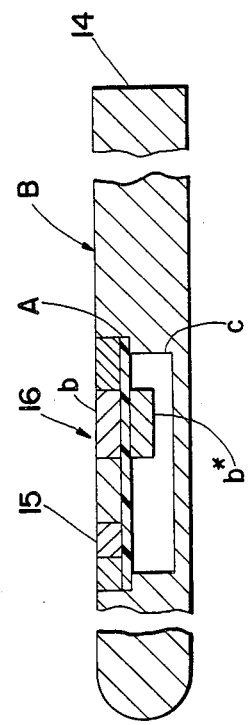
Figure 2A:
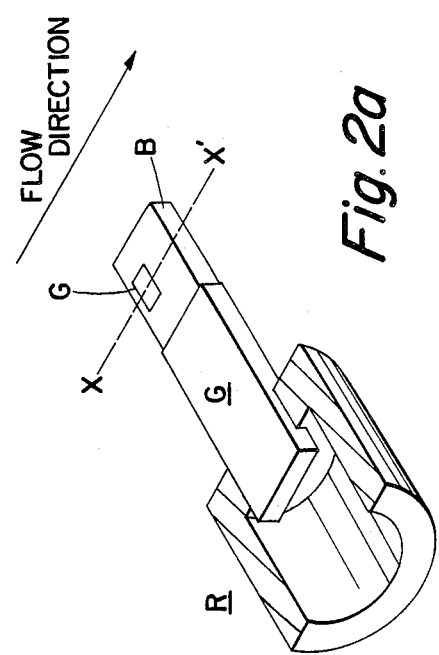
FIG. 2a is a fragmentary view in perspective of a unit for mounting in a pipe in which the fluid flow is to be measured.

The output temperature sensor 15 and the velocity or fluid-flow rate sensor unit 16 take the form shown on FIGS. 2a and 2b, being mounted in a cavity C in a thin slab B of electrically insulating material. The whole assembly is miniaturized in a solid-state chip.

The flow-rate sensor 16 actually comprises two identical thin-strip or thin-film elements b and b* mounted on opposite sides of a ceramic wafer A of high thermally insulating properties. Several ceramic materials can be used for this purpose, such as silicon nitride e.g. Advantageously Boron Nitride is used because it has high insulating resistance.

The location of the wafer A acting as a shield in the cavity C in the slab B shelters the element b* so that it does not touch the fluid 10 flowing in the pipe 11, whereas the element b is wetted by the fluid whenever the slab B is immersed in the fluid flow.

The wafer A is oriented in the flowing fluid in the direction of flow, with the resistor strips b and b* parallel to the direction of flow, the slab B extending transversely in the pipe 11 on the axis of the pipe.

Figure 3:
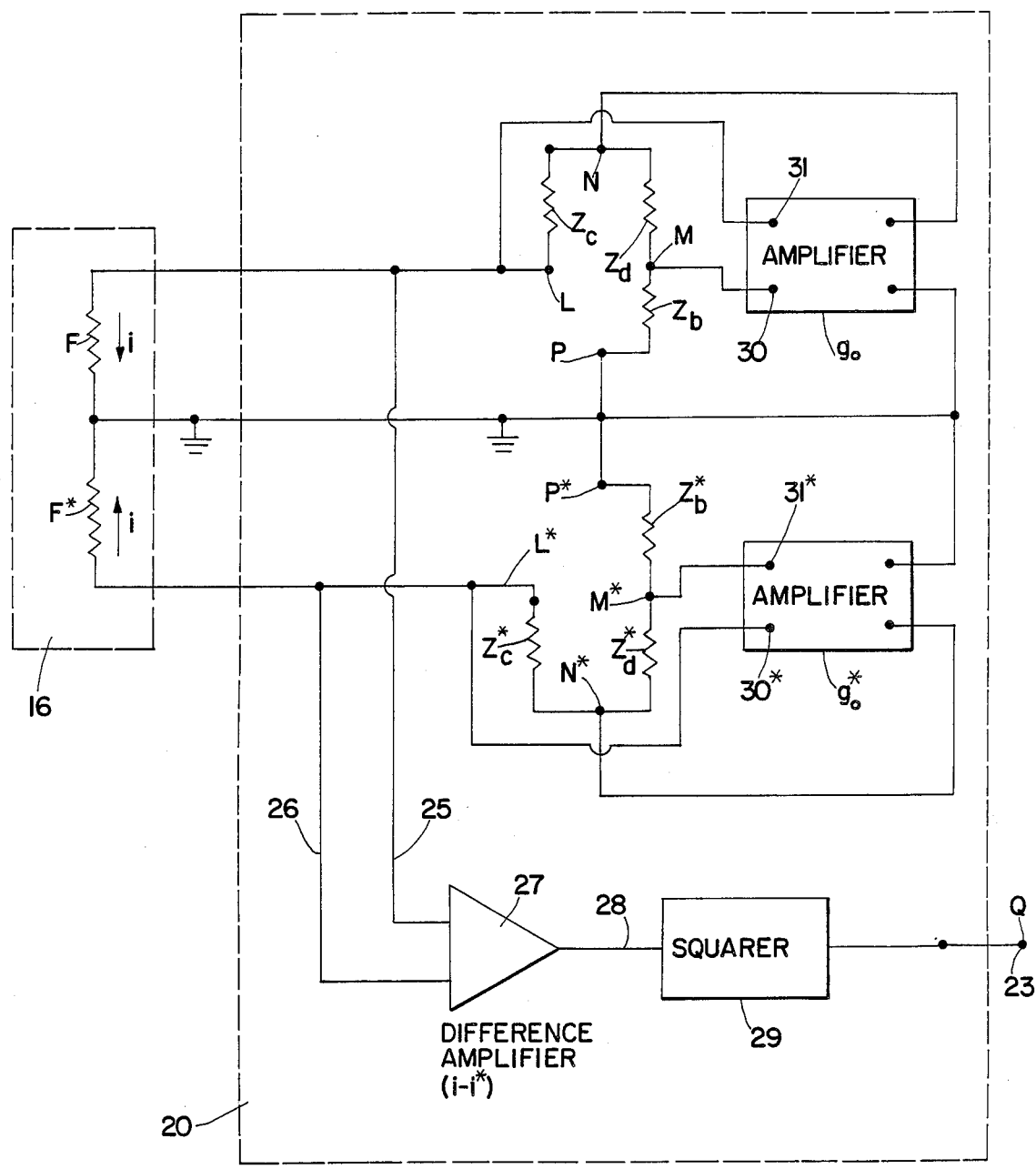
FIG. 3 is a diagram for the circuit employed to provide feedback control so as to maintain the sensors resistance at a constant value and to process the difference between the currents in the sensors.

In order to maintain the temperature and therefore the resistance F of the strip b at a constant value it is connected in a feedback circuit shown in FIG. 3. The circuit comprises a bridge of resistors F, Zb, Zc and Zd with output terminals L and M connected as input to terminals 30 and 31 of an operational amplifier $g_o$ with output feedback to bridge terminals N and P. The resistance of the resistor b* is represented as F*. It is connected in a similar manner to resistors Zb*, Zc* and Zd* that form a bridge with output terminals L* and M* connected as input to terminal 30* and 31* of an operational amplifier $g_o^*$.

For measurement of the difference in the currents i and i* circulating in the resistors F and F* the potential drops across F and F* all applied through lines 25 and 26 to the operational amplifier 27 used in a differential mode. The output of the amplifier is channelled through line 28 to a squarer 29. The output from the squarer is directly proportional to the flow rate Q.

As shown in FIG. 2a, the thin insulating slab B is supported by a rectangular tube G, serving as conduit for electrical leads from sensors 15, b and b* to a junction box R.

The circuits from the resistor film elements b and b* may be photoetched from silicon films on the ceramic wafer A and subsequently laser trimmed. By this technique the resistor values can be adjusted to a high degree of accuracy. The BTU rate of the heating load 12 is obtained from the readings of the three sensors, for temperature and flow rate, viz. 13, 15 and 16, yielding input temperature $T_1$, output temperature $T_o$, and fluid flow rate Q. It is inherent in a current-conducting material to have a resistance which varies with temperature. Accordingly resistance can be controlled by controlling temperature. In most materials resistance rises with temperature and applying heat to the material raises its temperature.

It is known that:

$$\text{BTU rate} = pC_pQ(T_o - T_1) \quad (1)$$

where p is the specific gravity, $C_p$ = the specific heat of the working fluid and Q the flow rate.

The flow rate Q is computed from measurements of the current in the resistor unit b* and the difference between the currents in the resistors b and b*.

The operation of the BTU rate meter is explained in the following manner. When a current is circulated in the resistance F of the element b, the heat q generated in F by ohmic dissipation, is i2R where R is the resistance F. This heat q is transferred to the environment in two ways, part of q, let us call it $q_o$, is convected by the flowing fluid. The other part $q_1$ is transported by conduction in the substrate or ceramic wafer A. Although $q_1$ is a small fraction of q, it cannot be neglected. Consequently:

$$q = q_o + q_1 \quad (2)$$

In a similar manner, when a current i* circulates in F*, the corresponding ohmic dissipation (i*) 2R* = q* is transported into the substrate A by conduction only. Since the film F* is sheltered from the fluid-flow there is no convection of thermal energy by the fluid. The heat loss by radiation from F and F* is so small that it can be neglected. Since the temperatures of F and F* are adjusted to be the same, it follows that $q^* = q_1$. Transport of heat by conduction is the same in both resistors b and b* because they are mounted in identical manners on the substrate A in the slab B.

It is known that the heat transferred in unit time by forced convection from one side of a plate is given by an expression of the form:

$$q_o = f(P_r, Re, T), \quad (3)$$

where Pr is the Prantl number, Re the Reynolds number, and T is the temperature difference between the plate and the fluid in which the plate is immersed.

The relationship between the currents i and i* can be expressed as:

$$i = i^* + \Delta i^* \quad (4)$$

Then it can be shown that the BTU rate measured by the apparatus is:

$$\text{BTU (rate)} = K(i^*)4(T_o - T_i)(\Delta i^*)^2 \quad (5)$$

where K is a constant related to the physical properties of the fluid and i* is another constant since the resistance F* has a fixed value.

One notices a very important aspect of the BTU Rate Meter concept viz., that the meter registers a zero reading when the fluid flow (and $\Delta i^*$) vanishes. The instrument, therefore, will operate well for low values of fluid velocities. This property stems from the fact that the BTU rate meter operation rests on a differential set of measurements, a great advantage of electronic instrumentation.

Figure 4A:
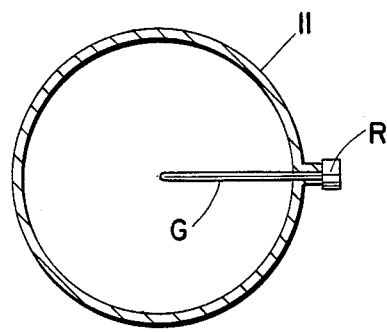
FIG. 4a is a cross-section view of a pipe with a modified embodiment of the invention installed.
Figure 4B:
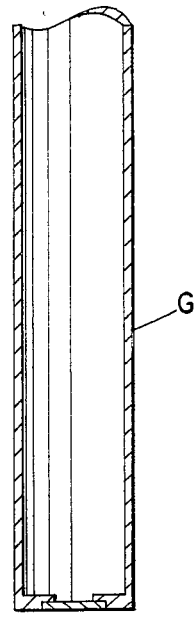
FIG. 4b is a view in section of a supporting tube for flow rate sensors.
Figure 4C:
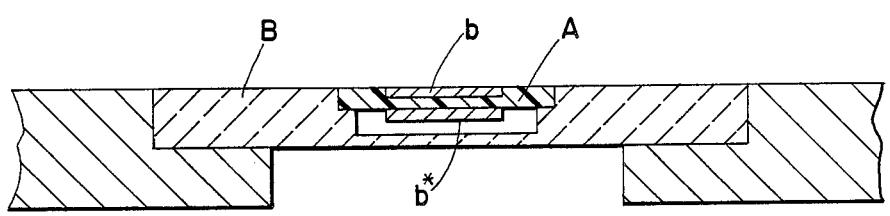
FIG. 4c is an enlarged cross-section view of the sensors and the mounting arangement.
Figure 5:
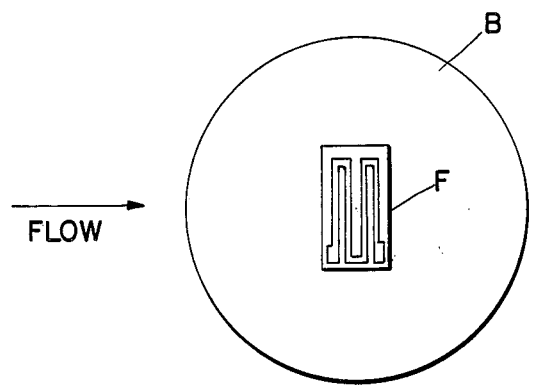
FIG. 5 is a plan view of the sensor mounting showing sensor configuration.

The invention is not limited to the physical shape and mounting arrangement of the heat flow unit 16 shown in FIGS. 2a and 2b. For example the insulsator slab B may be circular as shown in FIGS. 4b, 4c and 5 instead of rectangular. As indicated in FIG. 4b it is mounted at the inner end of the conduit G, which extends to the center of the pipe 11. It is also possible to place the resistors b and b* on the same side of the substrate, provided that b* is shielded from the flow. The configuration of the resistors b and b* is preferably zig-zag as shown by the resistance F in FIG. 5 for ease of construction.

While the invention has been described as embodied in concrete form and as operating in a specific manner in accordance with the provisions of the patent statutes, it should be understood that the invention is not limited thereto, since various modifications which suggest themselves to those skilled in the art without departing from the spirit of the invention.

What is claimed is:

1. Fluid flow rate measuring apparatus comprising first and second identical resistors with a common support, in contact with said support and supporting the first resistor exposed to the fluid, flow rate of which is to be measured, thus being in thermal relation to such fluid at substantially the temperature thereof, means for shielding the second resistor from exposure to the fluid connections to both resistors to supply electric current to them, means for adjusting the relative values of electric currents in the resistors to maintain them at the same temperature, whereby the difference in electric current flow is indicative of heat loss from the first resistor to the fluid by convection, and means for measuring the difference in electric currents.

2. Measuring apparatus as described in claim 1, wherein the means for adjusting relative current values comprises a feedback amplifier.

3. Measuring apparatus as described in claim 1, wherein means are provided for converting the current difference to rate of fluid flow.

4. Measuring apparatus as described in claim 3 including a pipe having an input section and an output section and in which fluid may flow from the input section to the output section, input and output temperature sensors mounted on the pipe at the input section and at the output section respectively, means for deriving a value of temperature difference from said sensors, and means for combining rate of fluid flow with value of temperature difference to provide an indication of rate of heat flow in the fluid.

5. Measuring apparatus as described in claim 3 wherein the means for converting current difference comprises a device for squaring the current difference.

6. Apparatus as in claim 5 including a pipe with input and output sections in which fluid may flow from the input section to the output section, input and output fluid temperature sensors mounted on the pipe at the input section and at the output section respectively, means for deriving a value of temperature difference from said sensors and a multiplier with input from the squaring device and the means for deriving a value of temperature difference.

7. Apparatus as described in claim 6, wherein input and output temperature sensors are provided together with a differential device connected to said temperature sensors and the multiplier also has an input from the differential device to produce an indication representative of heat flow rate.

8. A unit for apparatus responsive to rate of flow of fluid in a fluid stream comprising a slab in the stream, the slab having a cavity therein having an opening, a first resistor in the cavity, a shield in the cavity between the first resistor and the cavity opening, maintaining the first resistor out of contact with the fluid, a second resistor in the cavity exposed to fluid stream, means for heating the resistors, and means for comparing heat loss from the resistors.

9. A unit as described in claim 8 wherein the slab has a surface lying substantially along a plane, the stream has a predetermined direction, and means are provided for supporting the slab with its plane substantially parallel to the direction of the stream.

10. A unit as described in claim 8 wherein the resistors have a zig-zag configuration.

11. Fluid flow rate measuring apparatus comprising first and second resistors, means for supporting the resistors with the first resistor exposed to the fluid, flow rate of which is to be measured, means for shielding the second resistor from the fluid, connections to both resistors to supply electric current to them, and means for adjusting the relative values of electric currents in the resistors to maintain them at the same temperature, whereby the difference in electric current flow is indicative of heat loss from the first resistor to the fluid by convection, and means for measuring the difference in electric currents, wherein the resistor supporting means comprises a slab with a cavity therein with an opening toward the fluid, with the second resistor located in the cavity, the first resistor being located between the second and the opening of the cavity, and wherein a wafer is provided in the cavity between the two resistors, of sufficient size to close the cavity between the two resistors, and thereby shield the first resistor from the fluid.

12. Measuring apparatus as described in claim 11 wherein the wafer comprises boron nitride.

13. Measuring apparatus as described in claim 11 wherein the resistors are mounted on the wafer.

* * * * *